United States Patent [19]

Hehn et al.

[11] Patent Number: 4,889,244

[45] Date of Patent: Dec. 26, 1989

[54] STORAGE CONTAINER FOR AUDIO CASSETTE TAPE BOXES AND DIGITAL AUDIO COMPACT DISC BOXES

[75] Inventors: Bruce A. Hehn, Mass; James K. Sankey, Hudson, both of Ohio

[73] Assignee: Alpha Enterprises, Inc., Canton, Ohio

[21] Appl. No.: 233,462

[22] Filed: Aug. 18, 1988

[51] Int. Cl.$^4$ ................................................ A47F 7/00
[52] U.S. Cl. ........................................ 211/41; 211/40; 211/194; 206/387
[58] Field of Search ....................... 211/41, 40, 194; 206/309, 387; 312/8, 9, 10

[56] References Cited

U.S. PATENT DOCUMENTS

| | | | |
|---|---|---|---|
| 3,856,360 | 12/1974 | Commiant | 206/387 X |
| 3,963,287 | 6/1976 | Rumble | 206/387 X |
| 4,235,490 | 11/1980 | Schwartz et al. | 211/41 X |
| 4,266,834 | 5/1981 | Ackeret | 312/9 X |
| 4,453,785 | 6/1984 | Smith | 312/10 |

FOREIGN PATENT DOCUMENTS 2610832 9/1977 Fed. Rep. of Germany ...... 206/387

*Primary Examiner*—Robert W. Gibson, Jr.
*Attorney, Agent, or Firm*—Michael Sand Co.

[57] ABSTRACT

A storage container for audio cassette tape boxes and digital audio compact disc boxes. The storage container is an integral one-piece member formed by spaced, parallel top and bottom walls, a pair of spaced, parallel sidewalls, a partial rear wall, and an open front which provides access into the container. A pair of spaced, parallel partition walls equally divide the container into a pair of outer compartments and a center compartment. A plurality of spaced, parallel elongated first ribs extend inwardly of the top and bottom walls into the compartments for receiving a plurality of the compact disc boxes in each of the compartments. A plurality of spaced, parallel elongated second and third ribs extend inwardly of each of the pair of sidewalls into the outer compartments, and inwardly of each of the partition walls into the center compartment and a respective one of the outer compartments, for receiving a plurality of cassette tape boxes in each of the compartments. Each of the third ribs has a step formed thereon for predetermining the distance of insertion of a cassette tape box into the container, and the partial rear wall predetermines the distance of insertion of a compact disc box into the container. Various tongue and groove members formed on the outer surfaces of the container provide for slidably interconnnecting similar storage containers into a larger storage unit.

13 Claims, 3 Drawing Sheets

STORAGE CONTAINER FOR AUDIO CASSETTE TAPE BOXES AND DIGITAL AUDIO COMPACT DISC BOXES

TECHNICAL FIELD

The invention relates to storage containers and in particular to a container for storing both audio cassette tape boxes and digital audio compact disc boxes in the same unit. More particularly, the invention relates to such a dual storage container preferably having three compartments, each adapted for storing either cassette tape boxes or compact disc boxes, and which may be interconnected with other similar storage containers to form a larger storage unit.

BACKGROUND ART

In recent years, audio cassette tapes, and even more recently digital audio compact discs, have become the preferred media for recorded information such as music, speeches, etc. These newer forms of technology are beginning to outnumber the heretofore popular phonograph records. Many individuals have replaced or are in the process of replacing their phonograph record libraries with compact discs and/or cassette tapes. These individuals also have necessarily replaced their phonograph record players with compact disc players and/or cassette tape players. Cassette players now are widely used in automobiles and in many dwellings and businesses. The relatively new compact disc players are gaining wide acceptance in homes and other locations. Thus, an ever-increasing number of individuals own either a cassette tape player or a compact disc player, or both, as well as the cassette tapes and compact discs for replay thereon.

The known prior art includes many types of containers for storing either cassette tape boxes or compact disc boxes, which containers perform their intended storage purpose satisfactorily. However, none of these known prior art containers satisfactorily stores both cassette tape boxes and compact disc boxes.

The closest known prior art to the present invention is disclosed in U.S. Pat. Nos. 3,514,170; 4,741,438; and U.S. Design Pat. No. 296,153. The '170 patent shows stackable and interlocking containers but does not show a container adapted to receive both cassette tape boxes and compact disc boxes. The '438 patent discloses a storage tray capable of receiving dual and single compact disc boxes, and which is self-interlocking with other similar storage trays for forming a self-constructing cabinet, but which is not adapted to receive cassette tape boxes in addition to the compact disc boxes as is my storage container. The '153 design patent shows a cassette tape carrying case which also is not adapted to receive compact disc boxes.

Therefore, the need exists for a storage container adapted to receive both cassette tape boxes and compact disc boxes, and which can be interconnected with other similar storage containers to form a larger storage unit.

DISCLOSURE OF THE INVENTION

Objectives of the invention include providing a storage container adapted to receive audio cassette tape boxes and digital audio compact disc boxes in the same unit.

Another objective of the invention is to provide such a storage container for audio cassette tape boxes and digital audio compact disc boxes which can be interconnected with up to four other similar storage containers to form a larger storage unit.

A further objective of the invention is to provide such a storage container having a plurality of compartments, each of which is adapted for storing either cassette tape boxes or compact disc boxes, so that the storage container may be filled to capacity with only tape boxes, only disc boxes, or a combination of both.

Still another objective of the invention is to provide such a storage container in which the container can be filled to capacity with tape boxes and/or disc boxes without making it difficult to remove the stored boxes therefrom; and in which interconnection of a filled storage container with other similar filled storage containers to form a larger storage unit, does not interfere with the easy removal of the tape or disc boxes from the interconnected containers.

A still further objective of the invention is to provide such a storage container which stores the boxes in an organized and secure manner without entirely concealing the box insert which discloses the recorded information contained on the tape or disc, and which substantially shields the boxes and the tapes or discs contained therein from dust and direct sunlight.

Another objective of the invention is to provide such a storage container which is economical to manufacture, durable in use, easy to maintain, and aesthetically attractive.

These objectives and advantages are obtained by the storage container for audio cassette tape boxes and digital audio compact disc boxes of the invention, the general nature of which may be stated as including spaced, parallel top and bottom walls, a pair of spaced, parallel sidewalls, and an open front providing access into the container; a plurality of spaced, parallel elongated first ribs extending inwardly of at least one of the top and bottom walls into the container, the first ribs each being parallel to the sidewalls; a plurality of spaced, parallel elongated second ribs extending inwardly of each of the pair of sidewalls, the second ribs each being parallel to the top and bottom walls and aligned with a respective one of the second ribs of the opposite sidewall; a plurality of spaced, parallel elongated third ribs extending inwardly of each of the pair of sidewalls, at least one of the third ribs being located between each adjacent pair of the second ribs and further between the top and bottom walls and each of the second ribs adjacent thereto, the third ribs each being parallel to the second ribs and having a step formed thereon for predetermining the distance of insertion of a cassette tape box into the storage container; and stop means formed adjacent a rear end of the storage container for predetermining the distance of insertion of a compact disc box into the storage container.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

BEST MODE FOR CARRYING OUT THE INVENTION

Figure 1:
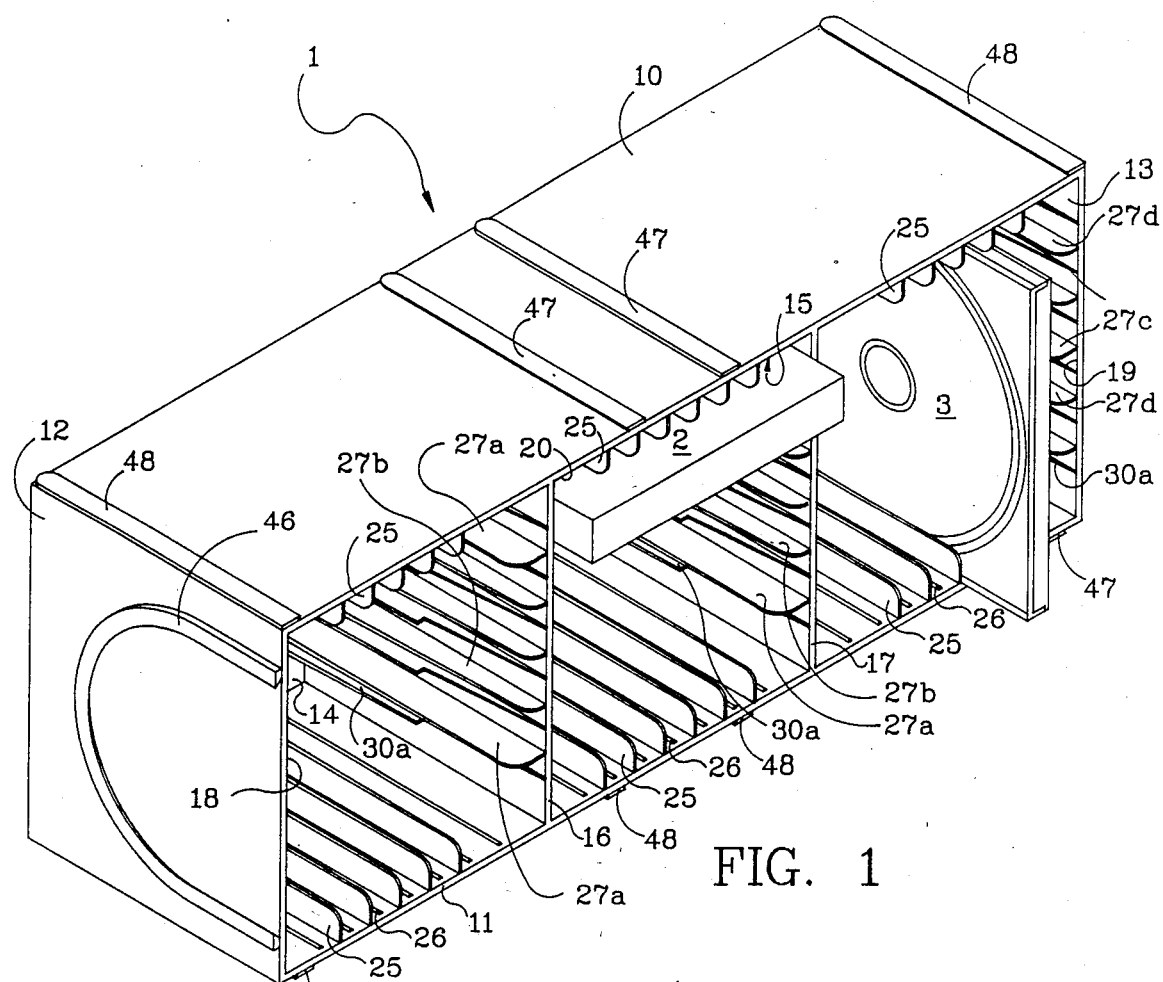
FIG. 1 is a perspective view of the storage container of the present invention, showing an audio cassette tape box and a digital audio compact disc box stored therein.

The storage container of the present invention is indicated generally at 1, and is shown in FIG. 1 storing an audio cassette tape box 2 and a digital audio compact disc box 3. Storage container 1 enables a user thereof to store his or her collection of cassette tapes and/or compact discs in an orderly, secure fashion, without entirely concealing the identification insert contained within the box along with the tape or disc. Thus, storage of tapes an/or discs in container 1 will not interfere with identification thereof when the user desires to select a certain tape or disc for play back. Moreover, container 1 substantially shields the tape and disc boxes stored therein from dust, direct sunlight, etc., which can cause deterioration or reduced quality of play back of the tapes and discs.

Figure 2:
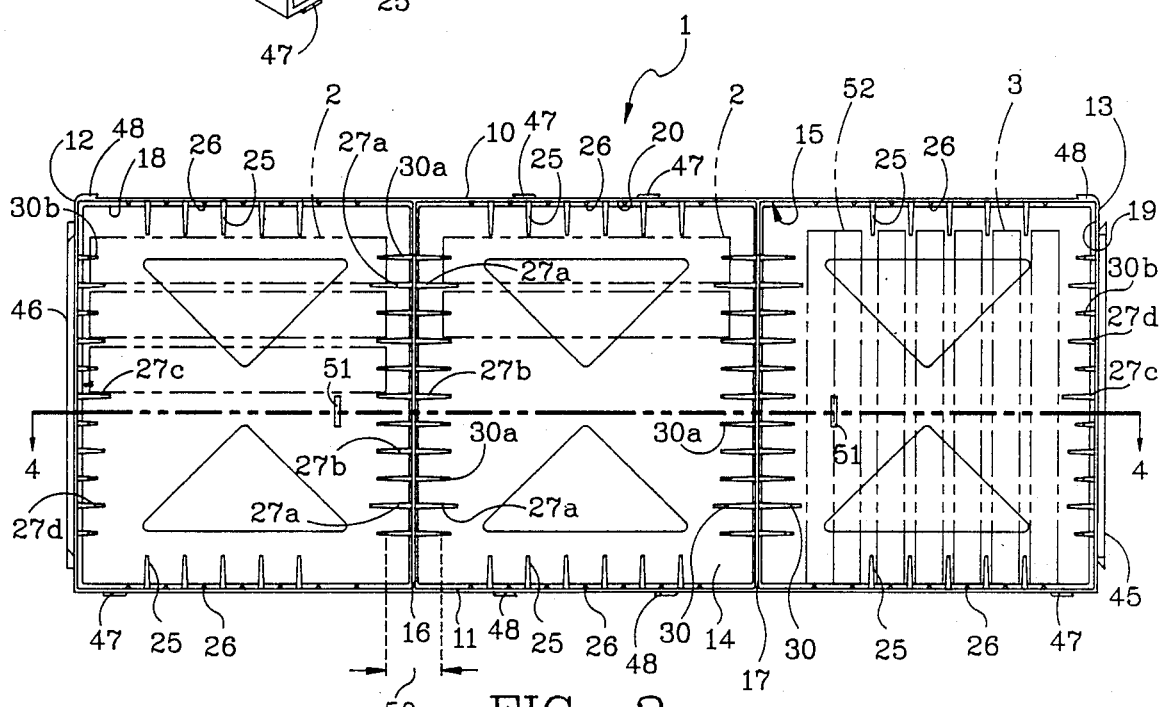
FIG. 2 is a front elevational view of the storage container of FIG. 1, showing in phantom lines a plurality of cassette tape boxes and compact disc boxes stored therein.
Figure 3:
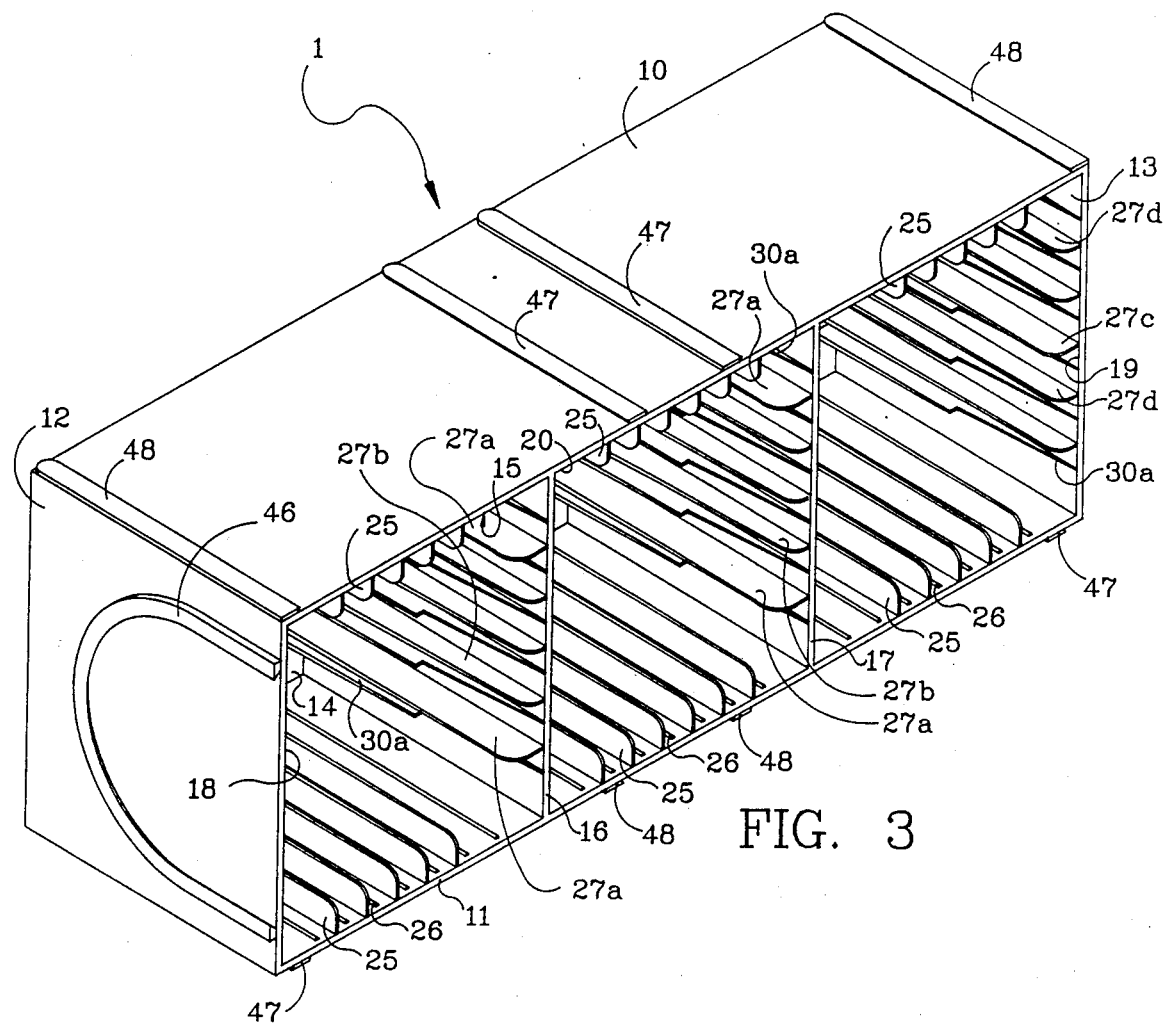
FIG. 3 is a perspective view similar to FIG. 1, with the cassette tape box and the compact disc box removed.

Storage container 1 is a generally rectangular-shaped, integral one-piece member, which preferably is formed of a plastic material by injection molding (FIGS. 2 and 3). Such an injection molded plastic construction is economically manufactured, durable in use, easy to maintain, and aesthetically pleasing. Storage container 1 comprises spaced, parallel top and bottom walls 10 and 11, a pair of spaced, parallel sidewalls 12 and 13, a partial rear wall 14, and an open front 15 which provides access into the container.

A pair of spaced, parallel partition walls 16 and 17 (FIGS. 2 and 3) equally divide container 1 into a pair of outer compartments 18 and 19 and a center compartment 20. Partition walls 16 and 17 are parallel to container sidewalls 12 and 13, so that each of the compartments 18, 19 to 20 is generally rectangularly-shaped.

Center compartment 20 and outer compartments 18 and 19 each includes a plurality of spaced, parallel elongated first ribs 25 which extend inwardly of top and bottom walls 10 and 11 into compartments 18–20 (FIGS. 2 and 3). Each first rib 25 is parallel to sidewalls 12 and 13 and partition walls 16 and 17, and is aligned with a respective one of the first ribs of the opposed top or bottom wall. First ribs 25 are adapted for receiving a plurality of compact disc boxes 3, as described below.

A plurality of spaced, parallel elongated support ribs 26 extend inwardly of each of the container top and bottom walls 10 and 11 into compartments 18–20 (FIGS. 2 and 3). Each support rib 26 is parallel to first ribs 25 and extends inwardly of top and bottom walls 10 and 11 a substantially shorter distance than the first ribs. Each support rib 26 is aligned with a respective one of the support ribs of the opposed top or bottom wall. A support rib 26 is located intermediate each adjacent pair of first ribs 25, and between sidewalls 12 and 13 and each of the first ribs adjacent thereto. A pair of support ribs 26 is located between partition walls 16 and 17 and each first rib 25 of outer compartments 18 and 19 adjacent thereto. A single support rib 26 is located between partition wall 16 and 17 and each first rib 25 of center compartment 20 adjacent thereto. Support ribs 26 provide bearing surfaces for the insertion and removal of compact disc boxes 3 into and from container 1.

A plurality of spaced, parallel elongated second ribs 27 extend inwardly of each sidewall 12 and 13 into outer compartments 18 and 19, respectively, and inwardly of each partition wall 16 and 17 into center compartment 20, and outer compartments 18 and 19, respectively. Each second rib 27 is parallel to top and bottom container walls 10 and 11. Each of the outer compartment partition wall second ribs 27 is aligned with a respective one of the second ribs of the sidewall of its respective outer compartment, and each of the center compartment partition wall second ribs is aligned with a respective one of the center compartment second ribs of the opposed partition wall. Second ribs 27 all are generally similar except that the topmost and bottommost second ribs 27a of partition walls 16 and 17 extend into center compartment 20 and outer compartments 18 and 19 a slightly greater distance than do second ribs 27b located therebetween, and the centermost second rib 27c of each sidewall 12 and 13 extends inwardly into outer compartments 18 and 19, respectively, a slightly greater distance than the other sidewall second ribs 27d.

A plurality of spaced, parallel elongated third ribs 30 extend inwardly of each sidewall 12 and 13 into outer compartments 18 and 19, respectively, inwardly of each partition wall 16 and 17 into center compartment 20, and outer compartments 18 and 19, respectively (FIGS. 2 and 3). Each third rib 30 is parallel to second ribs 27 and has a step 31 (FIG. 4) formed thereon for predetermining the distance of insertion of a cassette tape box 2 into container 1, as described in greater detail below. Each of the outer compartment partition wall third ribs 30a is aligned with a respective one of the third ribs 30b of the sidewall of its respective outer compartment, and each of the center compartment partition wall third ribs 30a is aligned with a respective one of the center compartment third ribs of the opposed partition wall. A third rib 30 is located intermediate each adjacent pair of second ribs 27 and further between top and bottom walls 10 and 11 and each of the topmost and bottommost second ribs 27a adjacent thereto. Third ribs 30 all are generally similar, except that third ribs 30a of partition walls 16 and 17 extend into center compartment 20 and outer compartments 18 and 19 a slightly greater distance than do third ribs 30b of sidewalls 12 and 13. Partial rear wall 14 serves to predetermine the distance of insertion of a compact disc box into storage container 1 as described below. In addition, outer compartments 18 and 19 are mirror images of each other due to the structure and arrangement of first ribs 25, support ribs 26, second ribs 27, and third ribs 30 therein.

Figure 4:
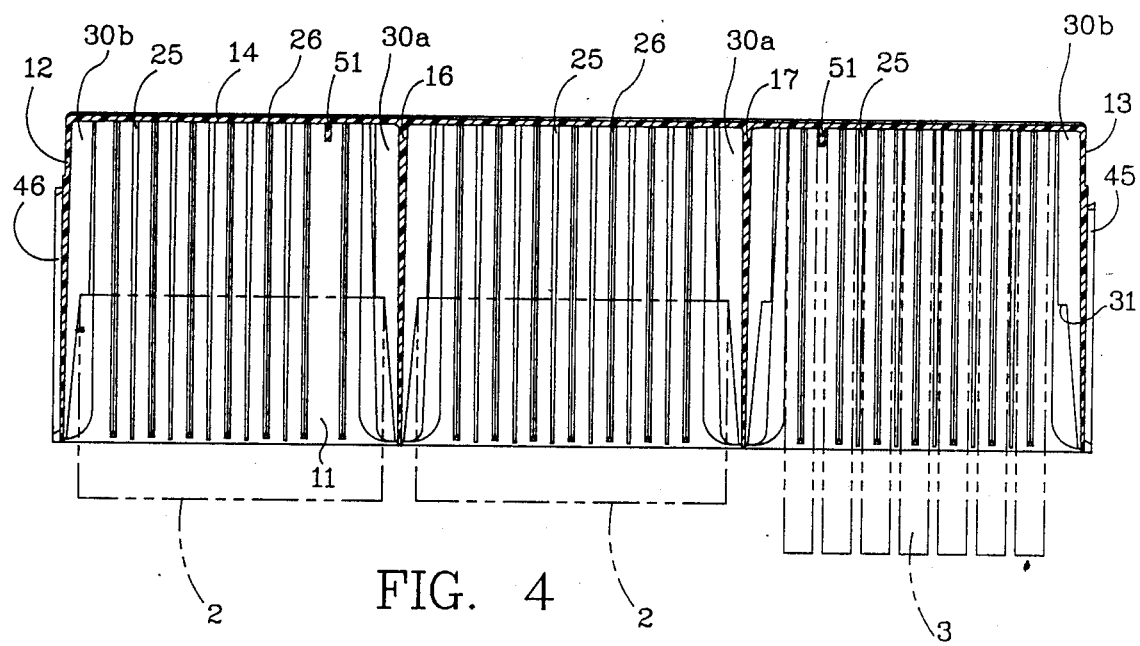
FIG. 4 is a longitudinal sectional view taken on line 4—4, FIG. 2, showing in phantom lines a plurality of cassette tape boxes and compact disc boxes fully inserted in the storage container.

A generally U-shaped tongue member 45 is formed on and extends outwardly of the outer surface of container sidewall 13, and a generally U-shaped groove member 46 is formed on and extends outwardly of the outer surface of container sidewall 12 (FIGS. 2–4). Tongue and groove members 45 and 46 are slidably engageable with complementary-shaped and sized groove and tongue members, respectively, of similar storage containers, for forming a larger storage unit (not shown) by interconnecting similar storage containers in a side by side relationship with container 1.

A pair of spaced, parallel elongated tongue members 47 is formed on the outer surface of each of the top and bottom walls 10 and 11 of container 1, and a pair of spaced, parallel elongated groove members 48 is formed on the outer surface of each of the top and bottom walls of the container (FIGS. 2 and 3). Tongue and groove members 47 and 48 are slideably engageable with complementary-shaped and sized groove and tongue members, respectively, of similar storage containers, for forming a larger storage unit by interconnecting similar storage containers in a top to bottom relationship with container 1. Thus, up to four other similar storage containers can be interconnected with each storage container 1, in a top to bottom and side to side relationship, to form a larger storage unit. It can be seen that a storage unit comprised of containers 1 can be constructed to almost any configuration and size in this manner. Audio cassette tape boxes 2 and digital audio compact disc boxes 3 are stored in container 1 of the present invention in the following manner. In accordance with one of the main features of the invention, each compartment 18, 19 and 20 of container 1 is adapted to receive either a plurality of cassette tape boxes or a plurality of compact disc boxes. Thus, the storage container can be filled to capacity with only tape boxes, only disc boxes, or a combination of both. If a cassette tape box is inserted in the storage container, the tape box either is held between aligned pairs of the second ribs, between an aligned pair of the topmost second ribs 27a and the first ribs of the top wall, or between an aligned pair of the bottommost second ribs 27a and the first ribs of the bottom wall (FIG. 2). The third ribs maintain a separation distance, indicated at 50, between each tape box and a tape box or disc box inserted in the adjacent compartment, as best shown in FIGS. 2 and 4. Thus, a user of container 1 can insert his or her fingers in separation distance 50 for easy grasping and removal of the tape box from the container. Up to six of the cassette tape boxes can be stored in vertically stacked relationship within each of the compartments of the container, if desired.

If it is desired to store compact disc boxes in the container, a single compact disc box 3 may be stored between aligned pairs of the first ribs, and between each aligned pair of the outermost first ribs of center compartment 20 and topmost and bottommost second ribs 27a of partition walls 16 and 17. Furthermore, a single compact disc box can be stored between the outermost aligned pair of first ribs of each of the outer compartments and third rib 27c of the respective compartment sidewall. A dual compact disc box 52 (FIG. 2) can be stored between the innermost aligned pair of first ribs of each of the outer compartments 18 and 19 and second ribs 27a of partition walls 16 and 17, respectively. Alternatively, a pair of single compact disc boxes 3 can be stored between the innermost aligned pair of first ribs of each of the outer compartments 18 and 19 and second ribs 27a of partition walls 16 and 17, respectively. A pair of nubs 51 each extend inwardly of partial rear wall 14 into a respective one of outer compartments 18 and 19. Nubs 51 provide for guiding and separating a pair of single compact disc boxes 3 inserted between the innermost aligned pair of first ribs of each of the outer compartments 18 and 19 and second ribs 27a of partition walls 16 and 17, respectively. Support ribs 26 act as a bearing surface to prevent excess wear on the top and bottom walls of the container which would otherwise be caused by repeated insertion and removal of disc boxes into and from the container. A disc box is easily removed from the storage container by tilting the exposed end of the box downwardly outwardly of the container, and grasping the box and removing it therefrom. This tilting action is possible since a conventional compact disc box resting on a support rib of the container bottom wall, does not extend to the top wall. Either seven of the single disc boxes, or five of the single boxes and a dual disc box, can be stored in side by side relationship within each of the compartments of the container, if desired.

In addition, the third ribs of container sidewalls 12 and 13 maintain a separation between any cassette tape boxes inserted in the outer compartments of the container and any tape boxes or disc boxes inserted in the outer compartments of similar storage containers which are interconnected with storage container 1 in a side by side relationship. Thus, any tape boxes stored in the outer compartments of a container which is interconnected in a side by side relationship with other similar containers, can easily be grasped and removed from the compartments due to this separation distance.

It is understood that storage container 1 can have more or less than three compartments without affecting the concept of the invention. Three storage compartments merely has been determined to be the most desirable number.

In summary, the storage container of the invention is adapted to receive audio cassette tape boxes and digital audio compact disc boxes, including boxes of the type containing two of the compact discs. The storage container is divided into three compartments, each of which is adapted for storing either cassette tape boxes or compact disc boxes, enabling the user thereof to fill it to capacity entirely with tape boxes, disc boxes, or a combination of both. The size of the compartments and the arrangement of the ribs therein makes it possible to fill the container to capacity, yet easily remove a tape box or disc box therefrom. This same compartment size and rib arrangement also allows for easy removal of the boxes when one or more of the filled storage containers are interconnected to form a larger storage unit. Moreover, the storage container enables a user's collection of compact discs and cassette tapes to be stored in an orderly and secure manner without entirely concealing the box insert which identifies the recorded information contained on the tape or disc, and also shields the tape and disc boxes from dust, direct sunlight, etc., which can cause damage to tapes and discs. Thus, the above are all features of the storage container of the invention, which is economical to manufacture, durable in use, easy to maintain, and attractive for use in a wide variety of settings.

Figure 5:
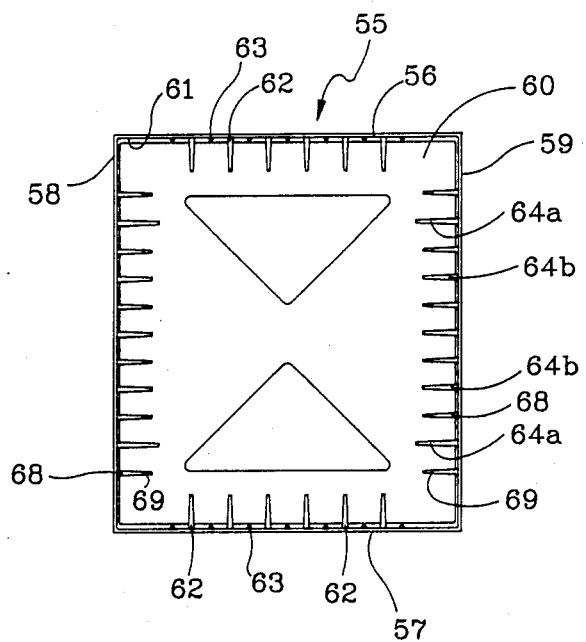
FIG. 5 is a front elevational view of another embodiment of the storage container of the invention.

A modification of storage container 1 is indicated generally at 55, and is shown in FIG. 5. Storage container 55 is similar to center compartment 20 of storage container 1 in its structure and function. Container 55 includes spaced, parallel top and bottom walls 56 and 57, a pair of spaced, parallel sidewalls 58 and 59, a partial rear wall 60, and an open front 61 which provides access into the storage container. A plurality of spaced, parallel elongated first ribs 62, which extend inwardly of each of the top and bottom walls 56 and 57 into container 55, each is parallel to sidewalls 58 and 59 and is aligned with a respective one of the first ribs of the opposed top or bottom wall. A plurality of spaced, parallel elongated support ribs 63 extend inwardly of each of the top and bottom walls 56 and 57 into container 55. Each support rib 63 is parallel to first ribs 62 and extends inwardly a distance substantially less than the first ribs. A support rib 63 is located intermediate each adjacent pair of first ribs 62 and between the sidewalls 58 and 59 and each of the outermost first ribs adjacent thereto. Each support rib 63 is aligned with a respective one of the support ribs of the opposed top or bottom container wall 56 or 57.

A plurality of spaced, parallel elongated second ribs 64 extend inwardly of each sidewall 58 and 59 into container 55. Each second rib is parallel to top and bottom walls 56 and 57 and is aligned with a respective one of the second ribs of the opposed sidewall. The topmost and bottommost second ribs 64a of each sidewall extend inwardly a slightly greater distance than the second ribs 64b located therebetween.

A plurality of spaced, parallel elongated third ribs 68 extend inwardly of each sidewall 58 and 59 into container 55. Each third rib 68 is parallel to the second ribs 64 and is aligned with a respective one of the third ribs of the opposed sidewall. A third rib 68 is located intermediate each adjacent pair of second ribs 64, and between the top and bottom walls 56 and 57 and each of the topmost and bottommost second ribs 64a adjacent thereto. Each third rib has a step 69 formed thereon for predetermining the distance of insertion of a cassette tape box into the storage container, and partial rear wall 60 predetermines the distance of insertion of a compact disc box into the container. Storage container 55 thus is used to store disc boxes or tape boxes in a manner similar to storage container 1, and attains many of the same advantages and features thereof.

Accordingly, the storage container is simplified, provides an effective, safe, inexpensive, and efficient construction which achieves all the enumerated objectives, provides for eliminating difficulties encountered with prior constructions and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the storage container is constructed and used, the characteristics of the construction, and the advantageous, new and useful results obtained; the new and useful structures, devices, elements, arrangements, parts, and combinations are set forth in the appended claims.

What is claimed is:

1. A storage container construction for audio cassette tape boxes and digital audio compact disc boxes, said storage container being an integral one-piece member and including:
   (a) spaced, parallel top and bottom walls, a pair of spaced, parallel sidewalls, and an open front providing access into the container;
   (b) a pair of spaced, parallel partition walls parallel to the sidewalls and equally dividing the storage container into a pair of outer compartments and a center compartment;
   (c) a plurality of spaced, parallel elongated first ribs extending inwardly of at least one of the top and bottom walls into the container compartments, said first ribs being parallel to the sidewalls and partition walls;
   (d) a plurality of spaced, parallel elongated second ribs extending inwardly of the pairs of sidewalls and partition walls into the container compartments, said second ribs each being parallel to the top and bottom walls and aligned with a respective one of the second ribs of the opposite sidewall or partition wall;
   (e) a plurality of spaced, parallel elongated third ribs extending inwardly of the pairs of sidewalls and partition walls into the container compartments, at least one of said third ribs being located between each adjacent pair of the second ribs and further between the top and bottom walls and each of said second ribs adjacent thereto, said third ribs being parallel to the second ribs and having a step formed thereon for predetermining the distance of insertion of a cassette tape box into the storage container; and
   (f) stop means formed adjacent a rear end of the storage container for predetermining the distance of insertion of a compact disc box into said storage container.

2. The construction defined in claim 1 in which a plurality of spaced, parallel elongated second ribs extend inwardly of each of the partition walls into the center compartment and a respective one of the outer compartments; in which each of said outer compartment partition wall second ribs is aligned with a respective one of the second ribs of the sidewall of its respective outer compartment; and in which each of said center compartment partition wall second ribs is aligned with a respective one of said center compartment second ribs of the opposite partition wall.

3. The construction defined in claim 1 in which a plurality of spaced, parallel elongated third ribs extend inwardly of each of the partition walls into the center compartment and a respective one of the outer compartments; in which each of said outer compartment partition wall third ribs is aligned with a respective one of the third ribs of the sidewall of its respective outer compartment; and in which each of said center compartment partition wall third ribs is aligned with a respective one of said center compartment third ribs of the opposite partition wall.

4. The construction defined in claim 1 in which the second and third ribs of the container sidewalls are similar in structure and arrangement to each other; and in which the outer compartment second and third ribs of the partition walls are similar in structure and arrangement to each other and to the center compartment second and third ribs of said partition walls.

5. The construction defined in claim 1 in which each of the compartments and the storage container are generally rectangular-shaped; and in which the pair of outer compartments are mirror images of each other.

6. The construction defined in claim 1 in which a plurality of the first ribs extend inwardly of each of the top and bottom walls into the container compartments; and in which each of the first ribs of the top wall is aligned with a respective one of the first ribs of the bottom wall.

7. The construction defined in claim 1 in which a plurality of spaced, parallel elongated support ribs extend inwardly of each of the top and bottom walls of the storage container into the center and outer compartments; in which said support ribs are parallel to the first ribs; in which said support ribs extend inwardly of the top and bottom walls a substantially shorter distance than said first ribs; in which each of the support ribs of the top wall is aligned with a respective one of the support ribs of the bottom wall; in which one of said support ribs is located intermediate each adjacent pair of the first ribs; in which one of said support ribs is located between the sidewalls and each of said first ribs adjacent thereto; and in which at least one of said support ribs is located between the partition walls and each of said first ribs adjacent thereto.

8. The construction defined in claim 1 in which the stop means is a partial rear wall; and in which a pair of nubs each extend inwardly of the partial rear wall into a respective one of the outer compartments.

9. The construction defined in claim 1 in which a pair of spaced, parallel elongated tongue members is formed on the outer surface of each of the top and bottom walls of the storage container; in which a pair of spaced, parallel elongated groove members is formed on the outer surface of each of the top and bottom walls of said storage container; and in which said tongue and groove members each is slideably engageable with complementary-shaped and sized groove and tongue members, respectively, of similar storage containers, wherein a larger storage unit is formed by interconnecting two or more of said storage containers in a top to bottom relationship.

10. A storage container construction adapted for storing a plurality of audio cassette tape boxes or a plurality of digital audio compact disc boxes including:
  (a) spaced, parallel top and bottom walls, a pair of spaced, parallel sidewalls, and an open front providing access into the container, wherein the spacing between said top and bottom walls is generally equal to the width of a compact disc box, and the spacing between said sidewalls is generally equal to the length of a cassette tape box;
  (b) a plurality of spaced, parallel first ribs extending inwardly of at least one of the top and bottom walls into the container, said first ribs each being parallel to the sidewalls;
  (c) a plurality of spaced, parallel second ribs extending inwardly of each of the pair of sidewalls, said second ribs each being parallel to the top and bottom walls and aligned with a respective one of the second ribs of the opposite sidewall so that a compact disc box can be stored between adjacent pairs of said first ribs and between the plurality of second ribs of each sidewall and the first rib adjacent thereto, and a cassette tape box can be stored between each aligned pair of said second ribs and an adjacent aligned pair of the second ribs, and between said plurality of first ribs of each of the top and bottom walls and the aligned pair of said second ribs adjacent thereto.

11. The construction defined in claim 10 in which stop means is formed adjacent a rear end of the storage container for predetermining the distance of insertion of a cassette tape box and a compact disc box into said storage container.

12. A storage container construction for audio cassette tape boxes and digital audio compact disc boxes including:
  (a) spaced, parallel top and bottom walls, a pair of spaced, parallel sidewalls, and an open front providing access into the container;
  (b) a plurality of spaced, parallel elongated first ribs extending inwardly of at least one of the top and bottom walls into the container, said first ribs being parallel to the sidewalls;
  (c) a plurality of spaced, parallel elongated second ribs extending inwardly of the pair of sidewalls into the container, said second ribs each being parallel to the top and bottom walls and aligned with a respective one of the second ribs of the opposite sidewall;
  (d) a plurality of spaced, parallel elongated third ribs extending inwardly of the pair of sidewalls into the container, at least one of said third ribs being located between each adjacent pair of the second ribs and further between the top and bottom walls and each of said second ribs adjacent thereto, said third ribs being parallel to the second ribs and having a step formed thereon for predetermining the distance of insertion of a cassette tape box into the storage container;
  (e) stop means formed adjacent a rear end of the storage container for predetermining the distance of insertion of a compact disc box into said storage container;
  (f) a generally U-shaped tongue member formed on and extending outwardly of an outer surface of a certain one of the container sidewalls, and a generally U-shaped groove member formed on and extending outwardly of the outer surface of the other of the container sidewalls, so that the tongue and groove members are slideably engageable with complementary-shaped and sized groove and tongue members, respectively, of similar storage containers, for forming a larger storage unit by interconnecting two or more of said storage containers in a side by side relationship.

13. A storage container construction for audio cassette tape boxes and digital audio compact disc boxes including:
  (a) spaced, parallel top and bottom walls, a pair of spaced, parallel sidewalls, and an open front providing access into the container;
  (b) at least one partition wall spaced from and parallel to the sidewalls dividing the storage container into a pair of compartments;
  (c) a plurality of spaced, parallel elongated first ribs extending inwardly of at least one of the top and bottom walls into the container compartments, said first ribs being parallel to the sidewalls and partition wall;
  (d) a plurality of spaced, parallel elongated second ribs extending inwardly of the pair of sidewalls and the partition wall into the container compartments, said second ribs each being parallel to the top and bottom walls and aligned with a respective one of the second ribs of the opposite sidewall or partition wall.
  (e) a plurality of spaced, parallel elongated third ribs extending inwardly of the pair of sidewalls and the partition wall into the container compartments, at least one of said third ribs being located between each adjacent pair of the second ribs and further between the top and bottom walls and each of said second ribs adjacent thereto, said third ribs being parallel to the second ribs and having a step formed thereon for predetermining the distance of insertion of a cassette tape box into the storage container; and
  (f) stop means formed adjacent a rear end of the storage container for predetermining the distance of insertion of a compact disc box into said storage container.

* * * * *